(12) United States Patent
Yamada

(10) Patent No.: US 9,797,718 B2
(45) Date of Patent: Oct. 24, 2017

(54) SOLID-STATE IMAGE SENSOR, DISTANCE MEASUREMENT APPARATUS INCLUDING THE SOLID-STATE IMAGE SENSOR, AND CAMERA

(71) Applicant: CANON KABUSHIKI KAISHA, Tokyo (JP)

(72) Inventor: Daisuke Yamada, Cambridge, MA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 661 days.

(21) Appl. No.: 13/748,428

(22) Filed: Jan. 23, 2013

(65) Prior Publication Data

US 2013/0258097 A1 Oct. 3, 2013

(30) Foreign Application Priority Data

Jan. 25, 2012 (JP) .................. 2012-013007

(51) Int. Cl.
*H04N 7/18* (2006.01)
*G01C 3/08* (2006.01)
*G03B 13/36* (2006.01)
*H04N 5/232* (2006.01)

(52) U.S. Cl.
CPC ............. *G01C 3/08* (2013.01); *G03B 13/36* (2013.01); *H04N 5/23212* (2013.01)

(58) Field of Classification Search
CPC .... H04N 5/23212; H04N 5/335; H04N 5/232; H04N 5/225; G01C 3/08; G03B 13/36
USPC ....... 348/135, 345, 360, 270–280, 300, 301, 348/315, 316, 308, 340
See application file for complete search history.

(56) References Cited

U.S. PATENT DOCUMENTS

| 8,711,270 | B2 * | 4/2014 | Onuki et al. .............. 348/345 |
| 2002/0121652 | A1 * | 9/2002 | Yamasaki .............. 257/222 |
| 2005/0036780 | A1 * | 2/2005 | Iwane .............. 396/111 |
| 2009/0290059 | A1 | 11/2009 | Suzuki |

FOREIGN PATENT DOCUMENTS

| JP | 2002199284 A | 7/2002 |
| JP | 4027113 B2 | 12/2007 |
| JP | 2008193527 A | 8/2008 |
| WO | 2012165255 A1 | 12/2012 |

\* cited by examiner

*Primary Examiner* — Trang U Tran
(74) *Attorney, Agent, or Firm* — Canon USA, Inc IP Division

(57) ABSTRACT

A solid-state image sensor including a plurality of pixels each including a photoelectric conversion element formed on a semiconductor. The solid-state image sensor includes a distance measurement pixel including a plurality of photoelectric conversion elements configured to acquire signals for distance measurement and included in at least a part of the plurality of pixels, and a control electrode disposed on the semiconductor via an insulating film, wherein the control electrode is configured to control positions or shapes of the photoelectric conversion elements by applied voltages, while the distance measurement pixel maintains the number of the plurality of photoelectric conversion elements.

11 Claims, 15 Drawing Sheets

SOLID-STATE IMAGE SENSOR, DISTANCE MEASUREMENT APPARATUS INCLUDING THE SOLID-STATE IMAGE SENSOR, AND CAMERA

BACKGROUND OF THE INVENTION

Field of the Invention

One disclosed aspect of the embodiments relates to a solid-state image sensor, a distance measurement apparatus including the solid-state image sensor, and a camera, and, more particularly, to the solid-state image sensor for distance measurement, which is used for distance measurement of a digital still camera or a digital video camera.

Description of the Related Art

In a digital still camera or a video camera, a solid-state image sensor, in which distance measurement pixels having a distance measurement (focus detection) function are arranged in all or a part of pixels of the solid-state image sensor to measure a distance in a phase difference method, is discussed in Japanese Patent No. 4027113. The distance measurement pixel includes a plurality of photoelectric conversion elements, and is configured such that light flux passing through different exit pupil areas of a imaging lens is guided to different photoelectric conversion elements. By using the plurality of distance measurement pixels, the distance measurement function detects images by light flux passing through different exit pupil areas (an image A and an image B, respectively) to measure a deviation amount of the image A and the image B. The distance measurement function calculates a defocus amount from the deviation amount and a base length (an interval between different exit pupil areas) to measure a distance (to detect a focus position).

In this case, an exit pupil surface of the imaging lens and a surface of the photoelectric conversion element have a substantially optical conjugate relation. Therefore, an exit pupil area, through which light flux passes, is determined according to the position or size of the surface of the photoelectric conversion element. For example, when a center of gravity of the photoelectric conversion element is arranged outward from a central axis of the distance measurement pixel, the exit pupil, through which light flux passes, is shifted to the outside of the pupil. Hence, the base length is lengthened. Also, when the photoelectric conversion element is enlarged, the exit pupil area, through which light flux passes, is enlarged. Therefore, light quantity received by the photoelectric conversion element is increased and sensitivity is increased accordingly.

However, in the actual distance measurement and image capture, the optimal base length or sensitivity (the position and size of the photoelectric conversion element) varies according to luminance of an object or a imaging condition (a defocus amount). For example, when the distance is measured with high accuracy, the base length needs to be lengthened. Also, in the case of a low-luminance object, noise increases and distance accuracy worsens. Therefore, the sensitivity needs to be increased by enlarging the area of the photoelectric conversion element. However, in the conventional methods, when distance measurement pixels are designed, the base length is uniquely determined. Therefore, an optimal distance measurement could not be achieved according to the object or the photographing condition.

SUMMARY OF THE INVENTION

One disclosed aspect of the embodiments is directed to a solid-state image sensor capable of performing distance measurement with high accuracy according to an object or a imaging condition, a distance measurement apparatus including the solid-state image sensor, and a camera.

According to an aspect of the embodiments, a solid-state image sensor including a plurality of pixels each including a photoelectric conversion element formed on a semiconductor includes a distance measurement pixel including a plurality of photoelectric conversion elements configured to acquire signals for distance measurement and included in at least apart of the plurality of pixels, and a control electrode disposed on the semiconductor via an insulating film, wherein the control electrode is configured to control positions or shapes of the photoelectric conversion elements by applied voltages, while the distance measurement pixel maintains the number of the plurality of photoelectric conversion elements.

According to exemplary embodiments, it is possible to realize a solid-state image sensor capable of performing distance measurement with high accuracy according to an object or a imaging condition, a distance measurement apparatus including the solid-state image sensor, and a camera.

Further features and aspects of the disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Figure 1:
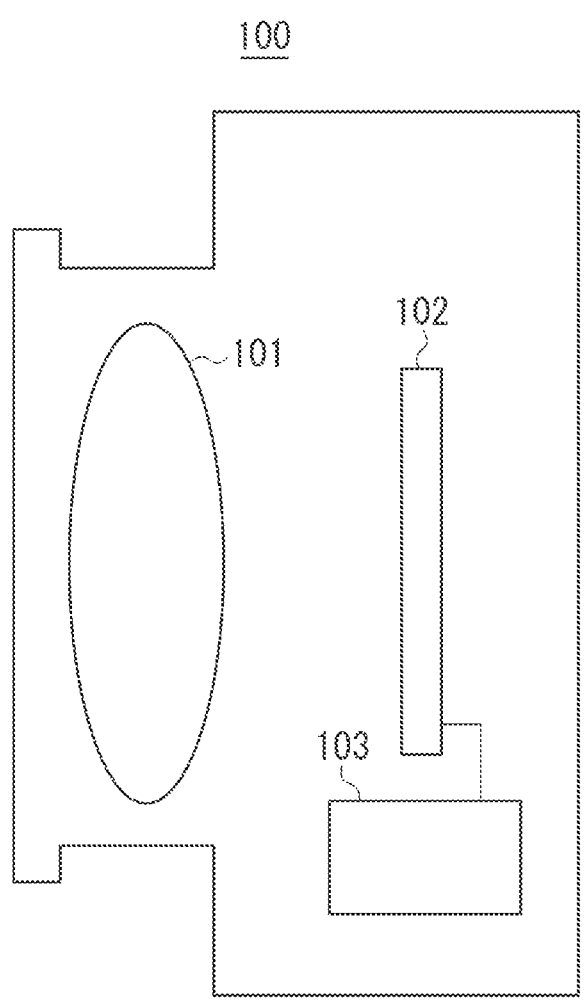
FIG. 1 is a diagram illustrating a distance measurement apparatus using a solid-state image sensor according to a first exemplary embodiment.

Various exemplary embodiments, features, and aspects of the disclosure will be described in detail below with reference to the drawings.

Hereinafter, a distance measurement apparatus including a solid-state image sensor according to each exemplary embodiment of the disclosure will be described. In the exemplary embodiment, as an example of an image pickup apparatus including the distance measurement apparatus, a digital still camera will be described, but the present exemplary embodiments are not limited thereto. Also, in the following description with reference to the drawings, the same reference numerals are assigned to components having the same function throughout all the drawings, and redundant description thereof will not be repeated.

Hereinafter, a first exemplary embodiment will be described. A distance measurement apparatus including a solid-state image sensor, to which the configuration of the present exemplary embodiment is applied, will be described. Referring to FIG. 1, a distance measurement apparatus 100 includes a imaging lens 101, a solid-state image sensor 102, and a calculation unit 103. In order to acquire distance information of an object, an image is formed on the solid-state image sensor 102 by the imaging lens 101, and an image A and image B of the object are acquired by a distance measurement pixel group disposed in the solid-state image sensor 102. Information of the acquired image A and image B is transmitted to the calculation unit 103, which calculates distance information of the object from a relation between a deviation amount and a base length.

Figure 2:
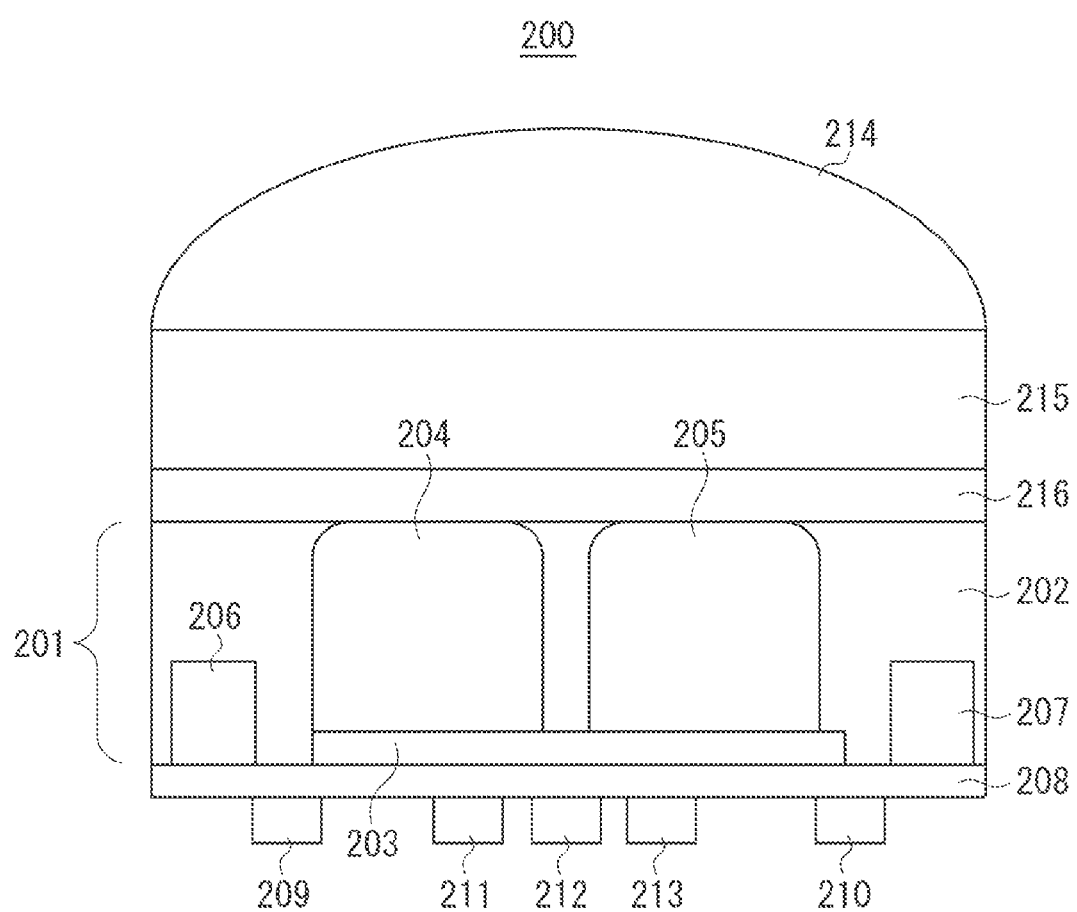
FIG. 2 is a schematic cross-sectional view illustrating a distance measurement pixel in the solid-state image sensor according to the first exemplary embodiment.

A configuration of a solid-state image sensor including a pixel, which measures a distance by a photoelectric conversion element in a semiconductor, according to the exemplary embodiment will be described with reference to FIG. 2. In FIG. 2, a pixel 200 is a pixel included in a distance measurement pixel group arranged in a part of pixels of the solid-state image sensor. The pixel 200 includes a P-type well 202 and a surface P+ layer 203 formed of a P-type, a first photoelectric conversion element 204, a second photoelectric conversion element 205, and floating diffusion portions (hereinafter, FD portions) 206 and 207 formed of an N-type in a semiconductor 201. Also, control electrodes are disposed on the semiconductor 201 through an insulating film. Specifically, a gate insulating film 208, gate electrodes 209 and 210, and control electrodes 211, 212 and 213 are disposed on the surface P+ layer 203 side of the semiconductor 201.

Light incident on the pixel 200 is guided to the first photoelectric conversion element 204 and the second photoelectric conversion element 205 through a light condensing unit 214, a color filter 215, and a planarization layer 216. Light incident on the photoelectric conversion elements 204 and 205 are converted into electrons to be accumulated within the photoelectric conversion elements 204 and 205. Subsequently, the distance measurement apparatus 100 transfers the electrons to the FD portions 206 and 207 by applying signals to the gate electrodes 209 and 210, to detect each charge amount as an electrical signal.

Figure 3:
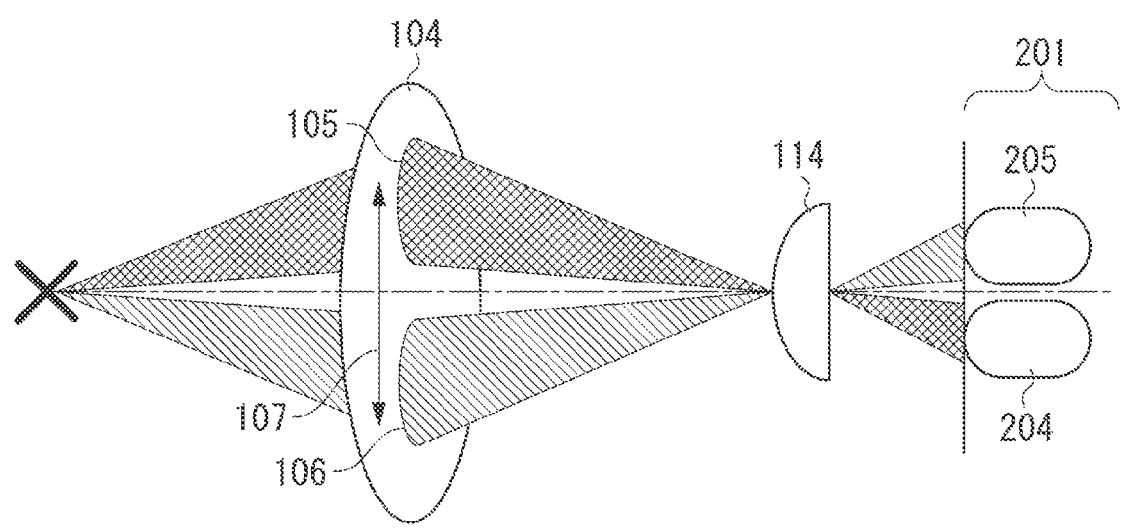
FIG. 3 is a diagram illustrating a method for measuring a distance to an object by using the solid-state image sensor according to the first exemplary embodiment of the present invention.

The acquisition of distance information is performed as follows. The surface of the semiconductor 201 and the surface of an exit pupil 104 of the imaging lens 101 have a substantially optical conjugate relation. Therefore, the first photoelectric conversion element 204 and the second photoelectric conversion element 205 of the distance measurement pixel receive light flux passing through different exit pupil areas (a first area 105 and a second area 106) (FIG. 3). In this case, the distance to the object may be measured by a known method by using a deviation amount of the image A generated via a plurality of first photoelectric conversion elements 204 and the image B generated via a plurality of second photoelectric conversion elements 205, and a base length 107.

Also, the acquisition of image capture information is performed as follows. In order to acquire a captured image by using the distance measurement pixel, the signals from the entire photoelectric conversion elements (the first photoelectric conversion elements 204 and the second photoelectric conversion elements 205) disposed within the pixels are added to obtain a captured signal passing through the entire exit pupil areas. Therefore, as in the general solid-state image sensor, an object image may be acquired in the entire pixels by using the distance measurement pixel.

Next, the operation principle of the present exemplary embodiment will be described. In the exemplary embodiment, the distance measurement apparatus 100 applies voltages to the control electrodes 211, 212 and 213 to enable dynamic control of the positions or shapes of the first photoelectric conversion element 204 and the second photoelectric conversion element 205. By applying a positive voltage to the control electrodes 211, 212 and 213, electron energy of the semiconductor 201 around the control electrodes 211, 212 and 213 via the gate insulating film 208 decreases. Therefore, an electron density increases and the semiconductor 201 changes to an N-type semiconductor.

On the other hand, by applying a negative voltage to the control electrodes 211, 212 and 213, electron energy of the semiconductor 201 around the control electrodes 211, 212 and 213 increases, so that an electron density decreases. Therefore, the semiconductor 201 changes to a P-type semiconductor. The photoelectric conversion elements 204 and 205 have a function of converting light into electrons and accumulating the generated electrons with lower electron energy than the surrounding. For this reason, the electron energy states of the photoelectric conversion elements 204 and 205 or the surroundings thereof are relatively changed. Therefore, the positions or shapes of the photoelectric conversion elements 204 and 205 may be controlled.

Also, by using the plurality of control electrodes 211, 212 and 213, the electron energy distributions of the photoelectric conversion elements 204 and 205 may be controlled with higher degree of freedom. Next, the measurement accuracy of the distance measurement apparatus 100 will be described when the control electrode 211 is disposed over the first photoelectric conversion element 204, the control electrode 212 is disposed above the first photoelectric conversion element 204 and the second photoelectric conversion element 205, and the control electrode 213 is disposed over the second photoelectric conversion element 205. When the control electrodes 211, 212 and 213 are disposed over the photoelectric conversion elements 204 and 205, the electron energy from the photoelectric conversion elements 204 and 205 disposed immediately beneath the control electrodes 211, 212 and 213 may be efficiently controlled. Also, when the control electrodes 211, 212 and 213 are disposed between the photoelectric conversion elements 204 and 205, the electron energy around the photoelectric conversion elements 204 and 205 may be efficiently controlled.

Figure 4A:
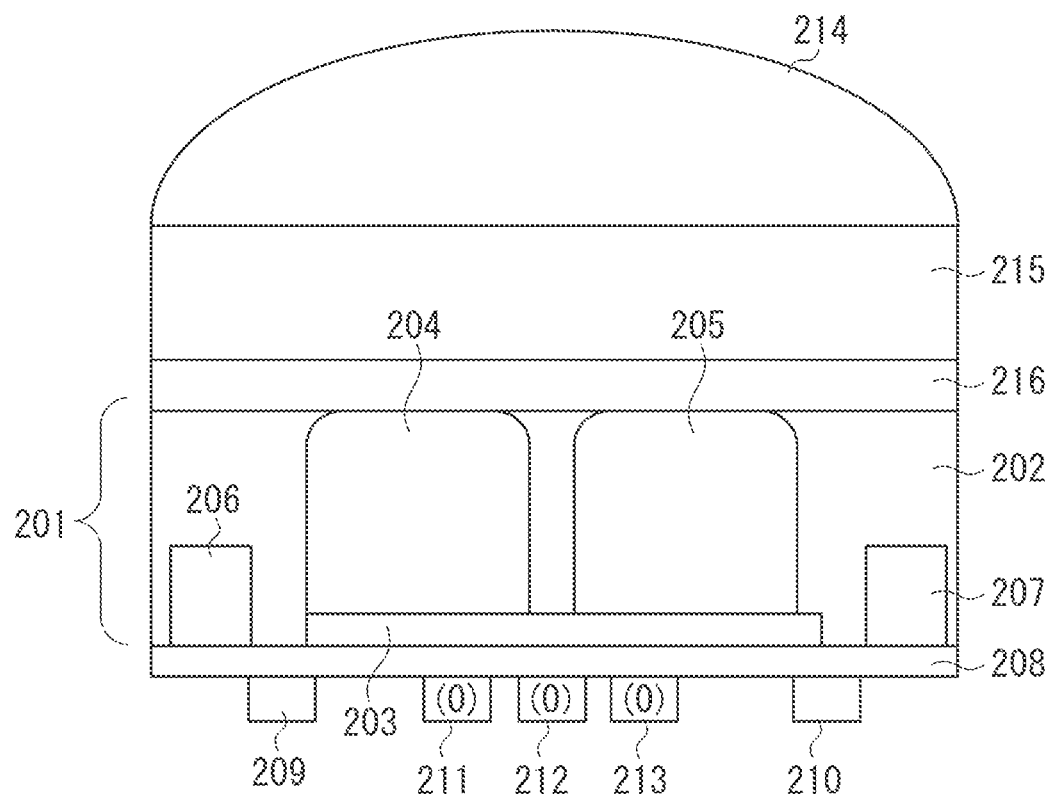
FIG. 4A is a diagram illustrating a method for controlling the solid-state image sensor according to the first exemplary embodiment.
Figure 4B:
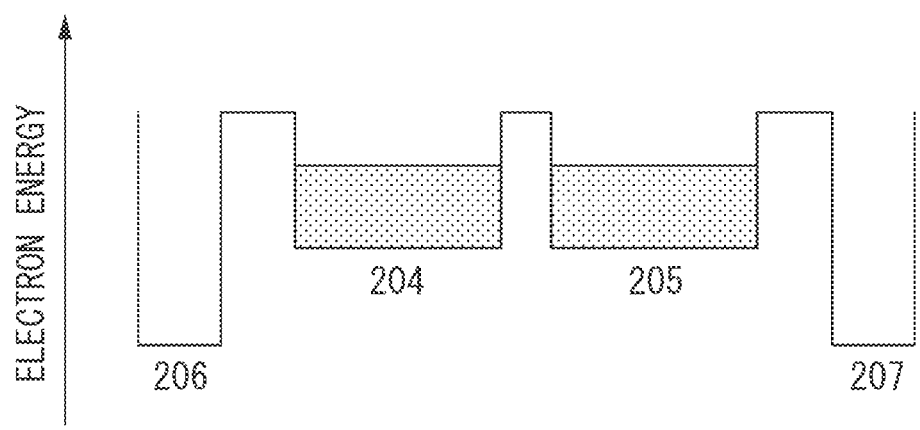
FIG. 4B is a diagram illustrating the electron energy of the elements according to the first exemplary embodiment.

As a normal mode, when no voltages are applied to the control electrodes 211, 212 and 213 (FIG. 4A), the electron energy distribution of the semiconductor 201 is determined by a manufactured doping concentration. Since the photoelectric conversion elements 204 and 205 accumulate electrons, the semiconductor 201 is formed of an N-type such that the electron energy is lowered (FIG. 4B). In this case, since no voltages are applied, power consumption is low. Therefore, long-time distance measurement or image capture measurement is enabled. Furthermore, when the first photoelectric conversion element 204 and the second photoelectric element 205 are formed to be bilaterally symmetric to a central axis of the pixel, signals of the image A and the image B having high signal-to-noise (SN) ratios may be obtained.

Figure 5A:
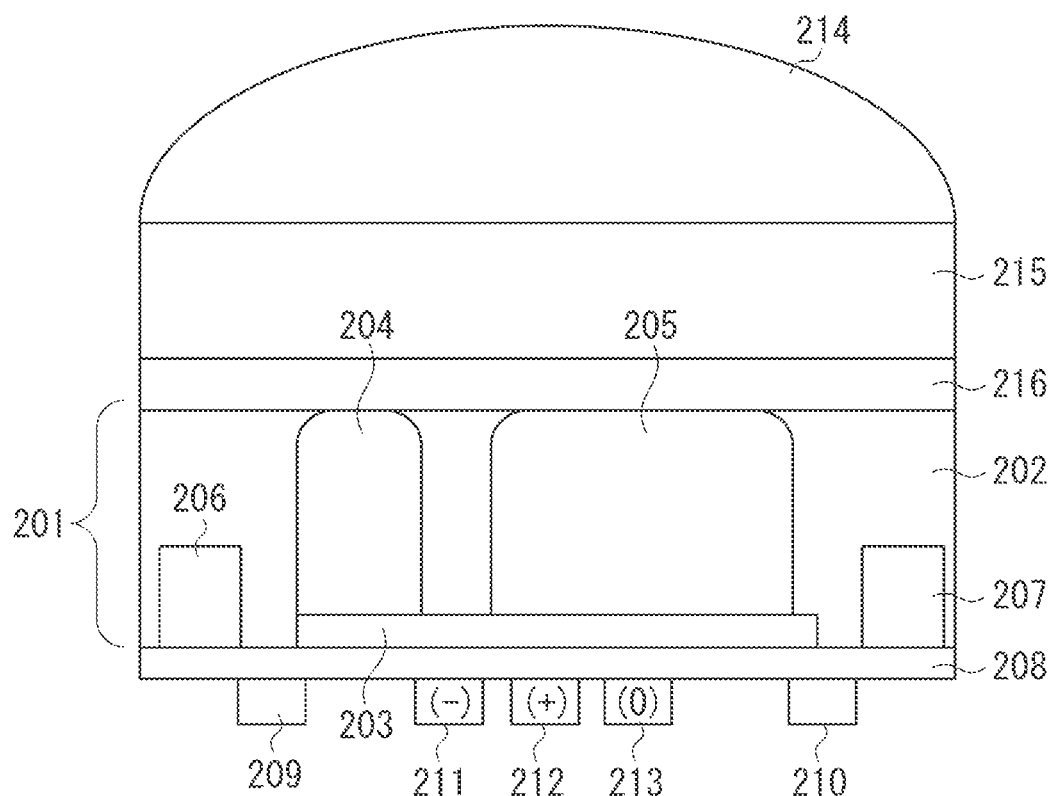
FIG. 5A is a diagram illustrating a method for controlling the solid-state image sensor for an image A according to the first exemplary embodiment.
Figure 5B:
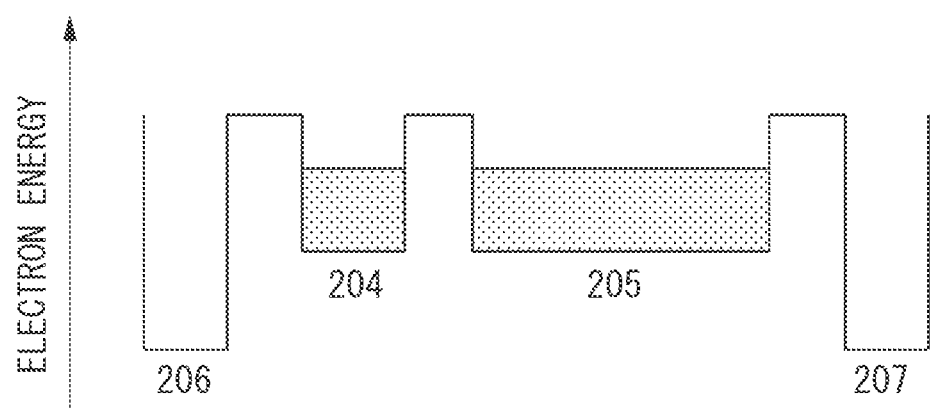
FIG. 5B is a diagram illustrating the electron energy of the elements for the image A according to the first exemplary embodiment.
Figure 5C:
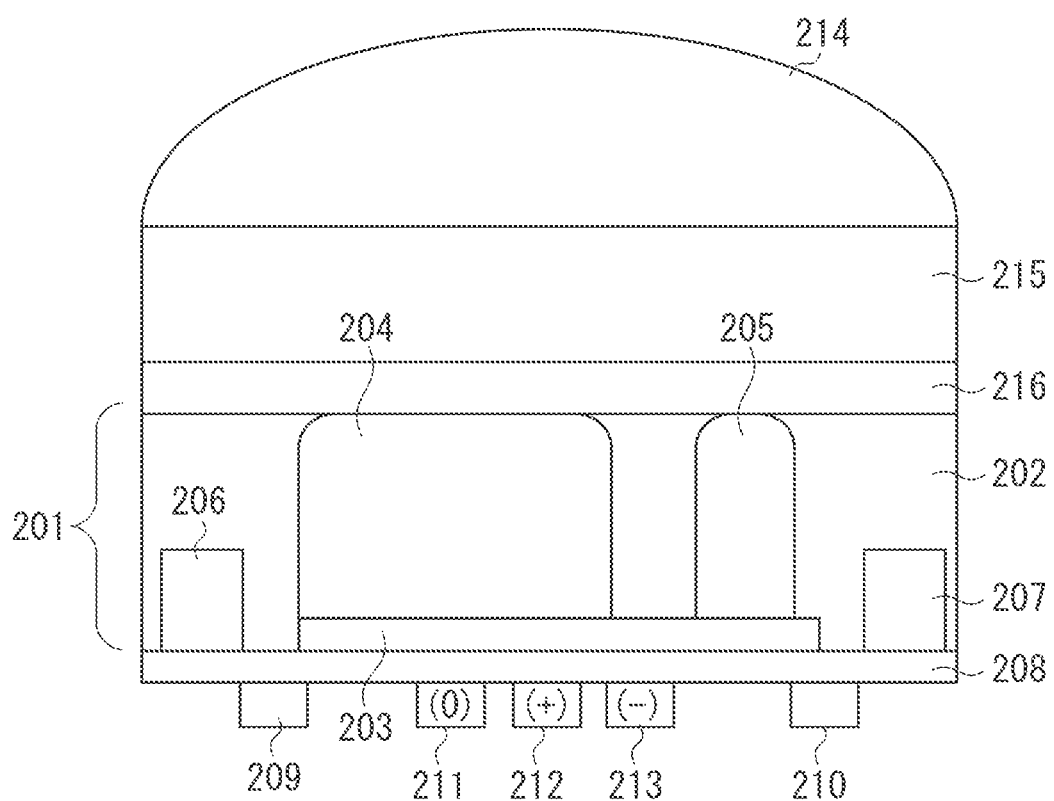
FIG. 5C is a diagram illustrating a method for controlling the solid-state image sensor for an image B according to the first exemplary embodiment.
Figure 5D:
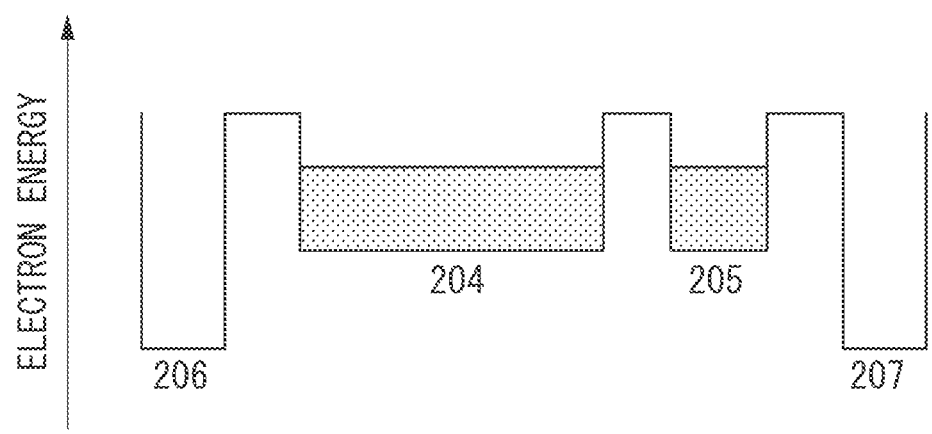
FIG. 5D is a diagram illustrating the electron energy of the elements for the image B according to the first exemplary embodiment.
Figure 6A:
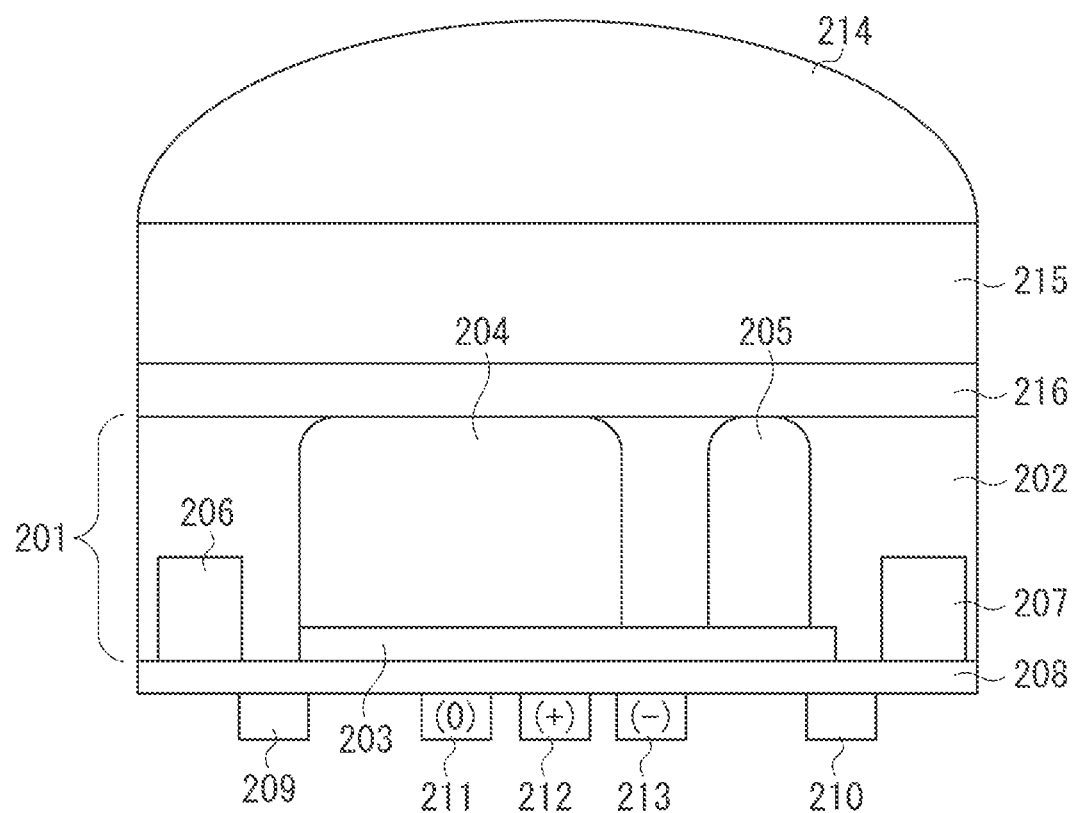
FIG. 6A is a diagram illustrating a method for controlling the solid-state image sensor for high speed capture of an image A according to the first exemplary embodiment.
Figure 6B:
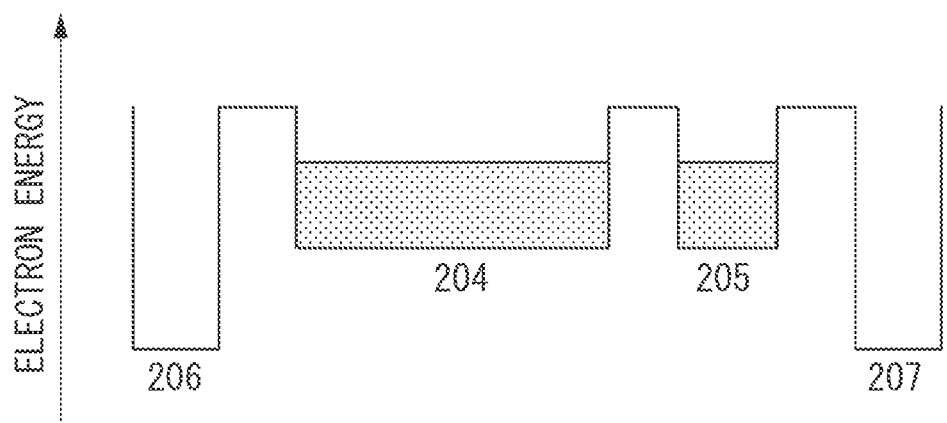
FIG. 6B is a diagram illustrating the electron energy of the elements for high speed image capture of an image A according to the first exemplary embodiment.
Figure 6C:
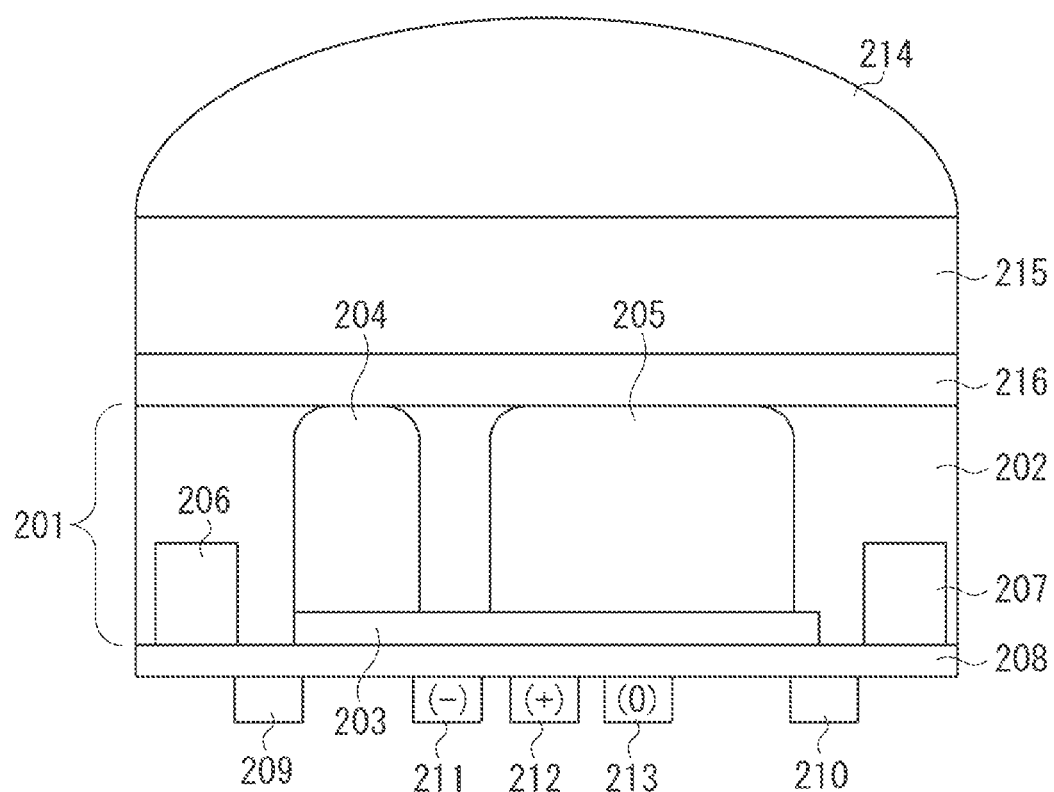
FIG. 6C is a diagram illustrating a method for controlling the solid-state image sensor for high speed capture of an image B according to the first exemplary embodiment.
Figure 6D:
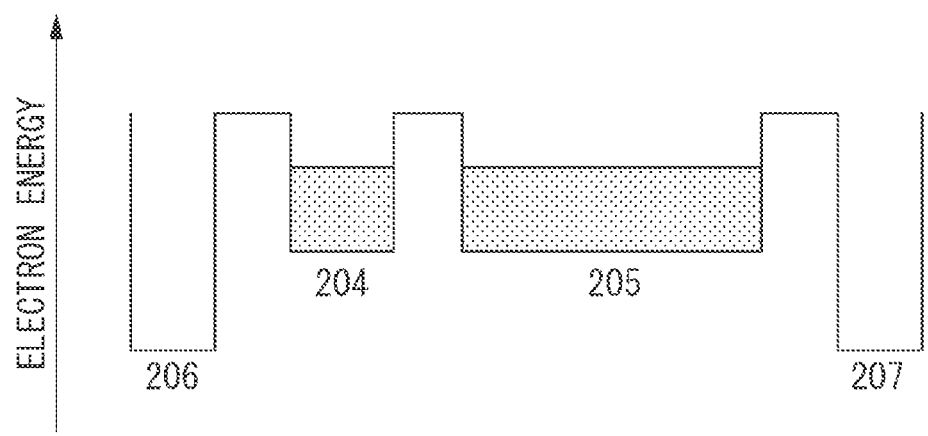
FIG. 6D is a diagram illustrating the electron energy of the elements for high speed image capture of an image B according to the first exemplary embodiment

Furthermore, as a high-accuracy mode, when the distance measurement is performed, the base length 107 needs to be lengthened. In this case, in the distance measurement pixel for acquiring the image A (FIG. 5A), a negative potential is applied to the control electrode 211, a positive potential is applied to the control electrode 212, and a zero potential is applied to the control electrode 213. In this manner, the electron energy distribution is obtained as illustrated in FIG. 5B. In particular, a center of gravity of the first photoelectric conversion element 204 is displaced outward from the central axis of the pixel. Also, in the pixel for acquiring the image B which is disposed near the pixel for acquiring the image A (FIG. 5C), a zero potential is applied to the control electrode 211, a positive potential is applied to the control electrode 212, and a negative potential is applied to the control electrode 213. In this manner, the center of gravity of the second photoelectric conversion element 205 is separated outward from the central axis of the pixel (FIG. 5D).

By using the image A and the image B mentioned above, the first photoelectric conversion element 204 and the second photoelectric conversion element 205 displaced outward from the central axis of the pixel may be obtained. Therefore, the base length 107 lengthens and the distance measurement accuracy improves accordingly. Also, even when the captured image is acquired, the signal resulting from the addition of the signals from the photoelectric conversion elements 204 and 205 within the pixel is sufficiently large. Therefore, a captured image having a high SN ratio may be obtained.

In the case of a low-luminance object in a high-sensitivity mode, a noise is large and a distance measurement error is increased. In this case, in the pixel for acquiring the image A, a zero potential is applied to the control electrode 211, a positive potential is applied to the control electrode 212, and a negative potential is applied to the control electrode 213. On the other hand, in the pixel for acquiring the image B, a negative potential is applied to the control electrode 211, a positive potential is applied to the control electrode 212, and a zero potential is applied to the control electrode 213. Therefore, the pixel having acquired the image A in the high-accuracy mode (FIGS. 5A, 5B, 5C and 5D) is switched to acquire the image B, and the pixel having acquired the image B is switched to acquire the image A. As a result, the high-sensitivity mode may be realized.

In this case, since the areas of the photoelectric conversion elements 204 and 205 for the acquisition of the image A and the image B increases, the SN ratio required for the distance measurement may be secured. As described above, an area of the specific photoelectric conversion element 204 and 205 is increased by changing an area ratio of the photoelectric conversion elements 204 and 205 in the distance measurement pixel. In this manner, the SN ratio increases in such a manner that the distance is measured by using the signal from the photoelectric conversion element having a large area. As a result, even in the case of the low-luminance object, the measurement may be performed with a small distance measurement error. In the exemplary embodiment, the control electrodes 211, 212 and 213 may control the positions or shapes of the photoelectric conversion elements 204 and 205 by the applied voltages, while allowing the distance measurement pixel to maintain the number of the plurality of photoelectric conversion elements.

When it is unnecessary to acquire the distance information, a zero potential is applied to the control electrode 211, a positive potential is applied to the control electrode 212, and a zero potential is applied to the control electrode 213. In this case, signals from the first photoelectric conversion element 204 and the second photoelectric conversion element 205 are added. In this manner, the signals from the photoelectric conversion elements 204 and 205 may be acquired not separately but simultaneously. Therefore, the read or processing time may be shortened. As a result, high-speed image capture may be performed (FIGS. 6A, 6B, 6C, and 6D).

As described above, the distance measurement apparatus arranges the control electrodes near the photoelectric conversion elements and applies the voltages thereto, so that the apparatus may change the electron energy distributions of the photoelectric conversion elements and the surrounding thereof. Therefore, the apparatus may dynamically control the positions or shapes of the photoelectric conversion elements. In the exemplary embodiment, the control electrodes may control the positions or shapes of the photoelectric conversion elements by the applied voltages, while allowing the distance measurement pixel to maintain the number of the plurality of photoelectric conversion elements. In this manner, the image pickup apparatus may achieve the distance measurement and the acquisition of the object image in an optimal measurement mode according to the object or the imaging condition.

Also, due to the dynamic change, the entire distance measurement pixels may be used for the distance information or the image capture information. Therefore, the distance measurement accuracy improves and the SN ratio of the captured image improves. Also, in the exemplary embodiment, aback side illumination type solid-state image sensor is used. In this case, since the control electrodes 211, 212 and 213 are disposed on a side opposite a direction of light incidence, light scattering and absorption by the control electrodes 211, 212 and 213 disappear. Therefore, the use of the back side illumination type solid-state image sensor may increase the sensitivity of the solid-state image sensor.

Figure 7A:
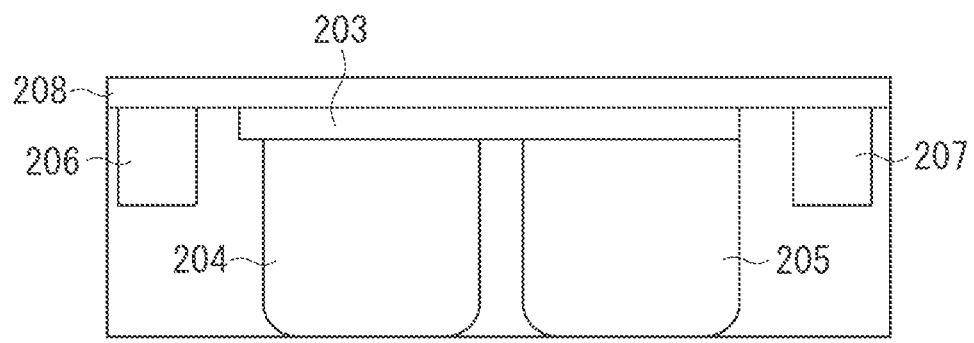
FIG. 7A is a diagram illustrating an initial phase of a process for manufacturing the solid-state image sensor including the distance measurement pixel according to the first exemplary embodiment.
Figure 7B:
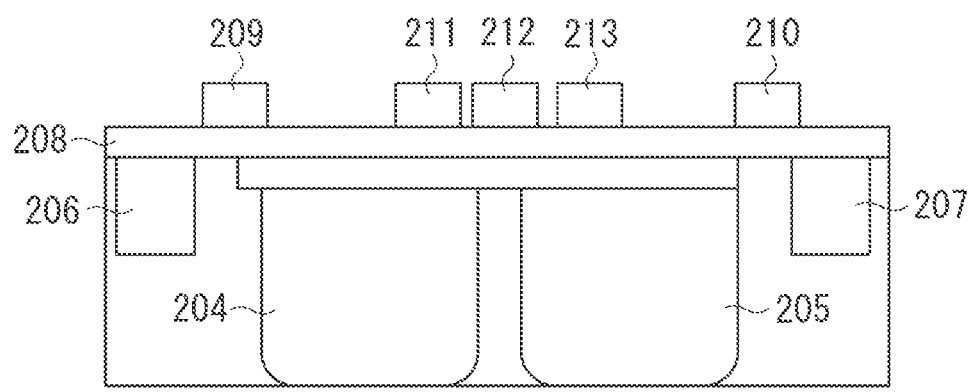
FIG. 7B is a diagram illustrating a process to form electrodes for a process for manufacturing the solid-state image sensor including the distance measurement pixel according to the first exemplary embodiment.

Next, a process for manufacturing the solid-state image sensor including the pixel 200 according to the exemplary embodiment will be described with reference to FIGS. 7A, 7B, 7C and 7D. First, the gate insulating film 208 is formed on a surface of the silicon semiconductor 201 by thermal oxidation. In order to form the photoelectric conversion elements 204 and 205 and the FD portions 206 and 207 in the semiconductor 201, a resist mask is formed at a predetermined position by photoresist, and impurity ion implantation is performed. Subsequently, the resist mask is removed by ashing. A diffusion layer (not illustrated) is formed by the similar ion implantation method (FIG. 7A). Furthermore, a polysilicon film is formed to form the gate electrodes 209 and 210 configured to transfer electrons generated in the photoelectric conversion elements 204 and 205, and the control electrodes 211, 212 and 213 configured to change the positions or shapes of the photoelectric conversion elements 204 and 205. Subsequently, the gate electrodes 209 and 210 and the control electrodes 211, 212 and 213 are formed by etching the polysilicon in predetermined patterns by using a photolithography process (FIG. 7B).

Figure 7C:
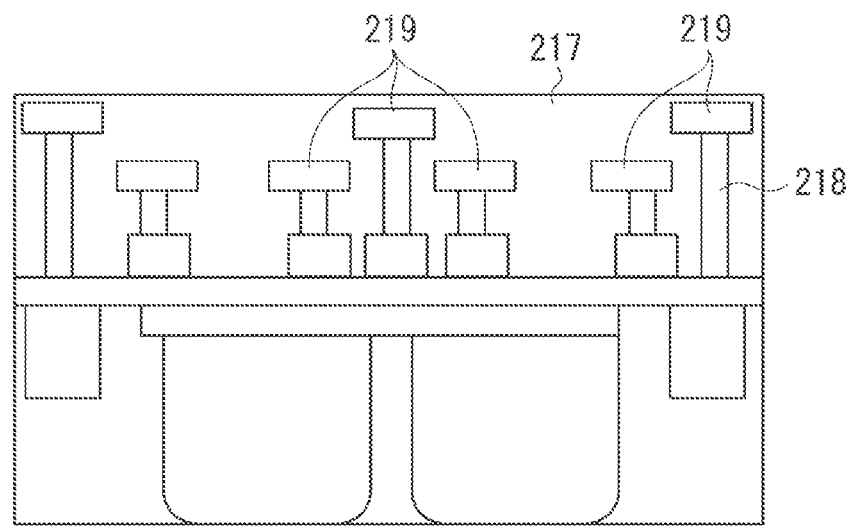
FIG. 7C is a diagram illustrating a process to form interconnections, contact holes, and interconnection for a process for manufacturing the solid-state image sensor including the distance measurement pixel according to the first exemplary embodiment.
Figure 7D:
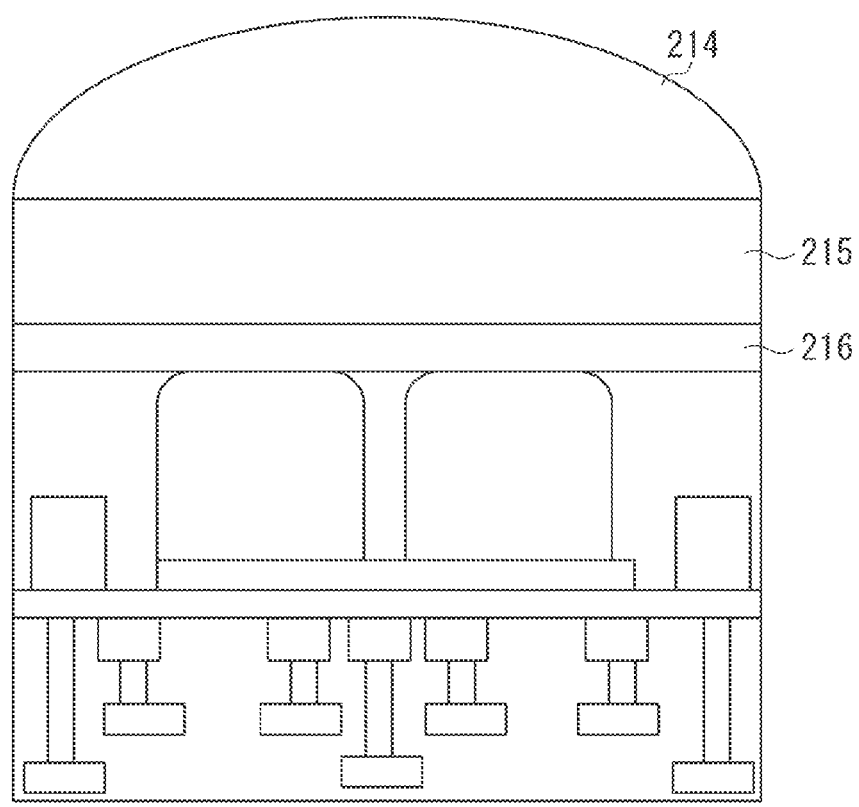
FIG. 7D is a diagram illustrating a process to form planarizing filter, color filter, and microlense for a process for manufacturing the solid-state image sensor including the distance measurement pixel according to the first exemplary embodiment.

Subsequently, an interlayer insulating film 217, for example, a boron phosphorus silicon glass (BPSG) film, is formed on the semiconductor 201, the gate electrodes 209 and 210, and the control electrodes 211, 212 and 213, and planarization is performed with a chemical mechanical polishing (CMP) method. Subsequently, for electrical connection, a connection hole, such as a contact hole 218, is formed on the interlayer insulating film 217 to be electrically connected to other metal interconnection. In a similar manner, an interconnection 219 is formed and covered with the interlayer insulating film 217 (FIG. 7C). Subsequently, the side of the semiconductor 201 opposite the gate insulating film 208 is polished and thinned until the photoelectric conversion elements 204 and 205 are exposed. Subsequently, if needed, a planarization film 216, a color filter 215, and a microlens 214 are formed (FIG. 7D).

Hereinafter, as a second exemplary embodiment, a distance measurement apparatus including a solid-state image sensor different from the first exemplary embodiment will be described. Also, a description of the same components as the first exemplary embodiment will not be repeated.

Figure 8:
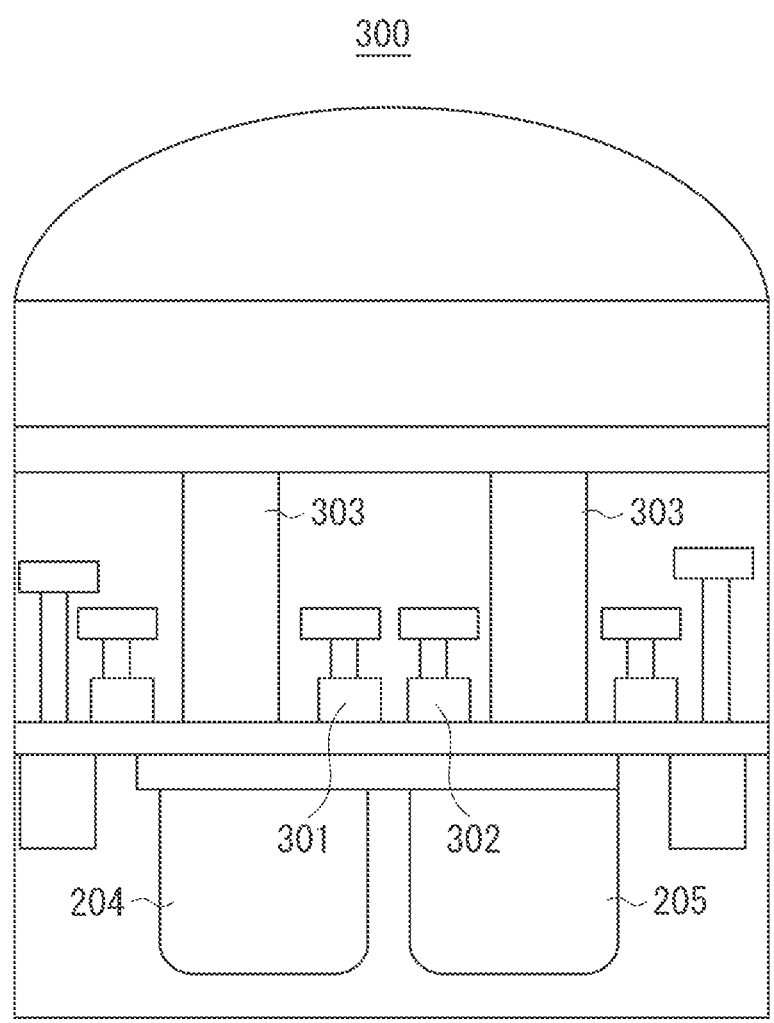
FIG. 8 is a schematic cross-sectional view illustrating a distance measurement pixel in a solid-state image sensor according to a second exemplary embodiment.

FIG. 8 is a cross-sectional view illustrating a distance measurement pixel of the solid-state image sensor according to the present exemplary embodiment. Referring to FIG. 8, the solid-state image sensor includes a distance measurement pixel 300. In the exemplary embodiment, the distance measurement pixel 300 includes two control electrodes 301 and 302 which are respectively disposed on the central axis side of the distance measurement pixel 300 above a first photoelectric conversion element 204 and a second photoelectric conversion element 205. Also, incident light is incident from the same direction as gate electrodes and the control electrodes 301 and 302, and reaches the photoelectric conversion elements 204 and 205.

Figure 9:
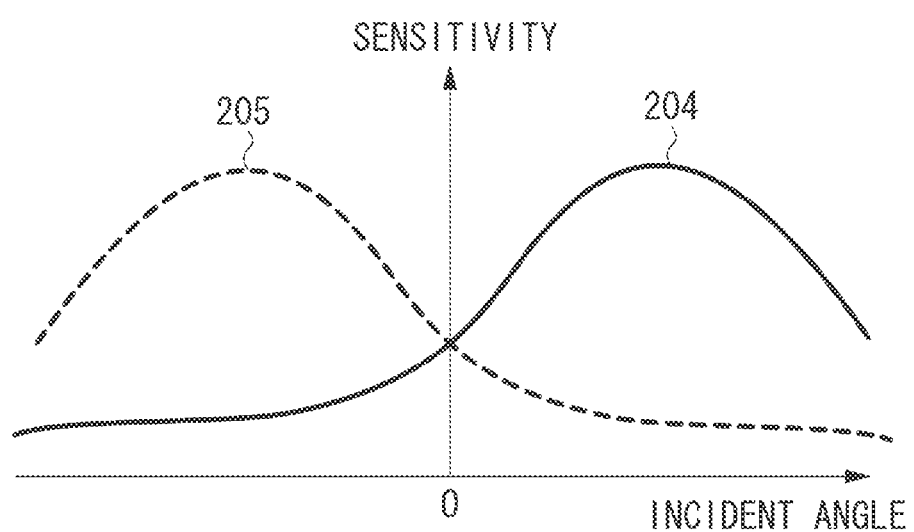
FIG. 9 is a diagram illustrating an incident angle sensitivity characteristic of the solid-state image sensor according to the second exemplary embodiment.

In this case, a waveguide structure 303 having a higher refractive index than the surrounding is included immediately above the photoelectric conversion elements 204 and 205 so that light may not be scattered or absorbed in the gate electrodes and the control electrodes 301 and 302. Therefore, even when electrodes, such as the gate electrodes and the control electrodes 301 and 302, are disposed, the incident light may be efficiently guided to the photoelectric conversion elements 204 and 205. Also, in this case, the first photoelectric conversion element 204 and the second photoelectric conversion element 205 in the distance measurement pixel 300 have an asymmetric incident angle sensitivity characteristic to the incident angle of the incident light, as illustrated in FIG. 9.

The acquisition of distance information is performed as follows. When having the asymmetric incident angle sensitivity characteristic illustrated in FIG. 9, the first photoelectric conversion element 204 receives light passing through the first area 105 in the exit pupil 104 of the photoelectric lens 101. Also, the second photoelectric conversion element 205 receives light passing through the second area 106 in the exit pupil 104 of the photoelectric lens 101. Therefore, even though a guide unit, such as the waveguide structure 303, is used instead of a light condensing unit, such as a lens, if the solid-state image sensor has the asymmetric incident angle sensitivity characteristic, the solid-state image sensor may similarly detect light flux from different portions of the exit pupil 104. In this manner, the distance measurement apparatus may acquire the image A and the image B by using a plurality of distance measurement pixels, and measure the distance from the deviation amount and the base length with the similar method as the first exemplary embodiment.

Next, the operation principle of the present exemplary embodiment will be described. When configured as illustrated in FIG. 8, by applying voltages to the control electrodes 301 and 302, the distance measurement apparatus may control the electron energy distribution around the photoelectric conversion elements 204 and 205, and dynamically change the positions or shapes of the first photoelectric conversion element 204 and the second photoelectric conversion element 205. The change of the photoelectric conversion elements 204 and 205 and the distance measurement accuracy of the distance measurement apparatus in a state where the two control electrodes 301 and 302 are included will be described.

Figure 10A:
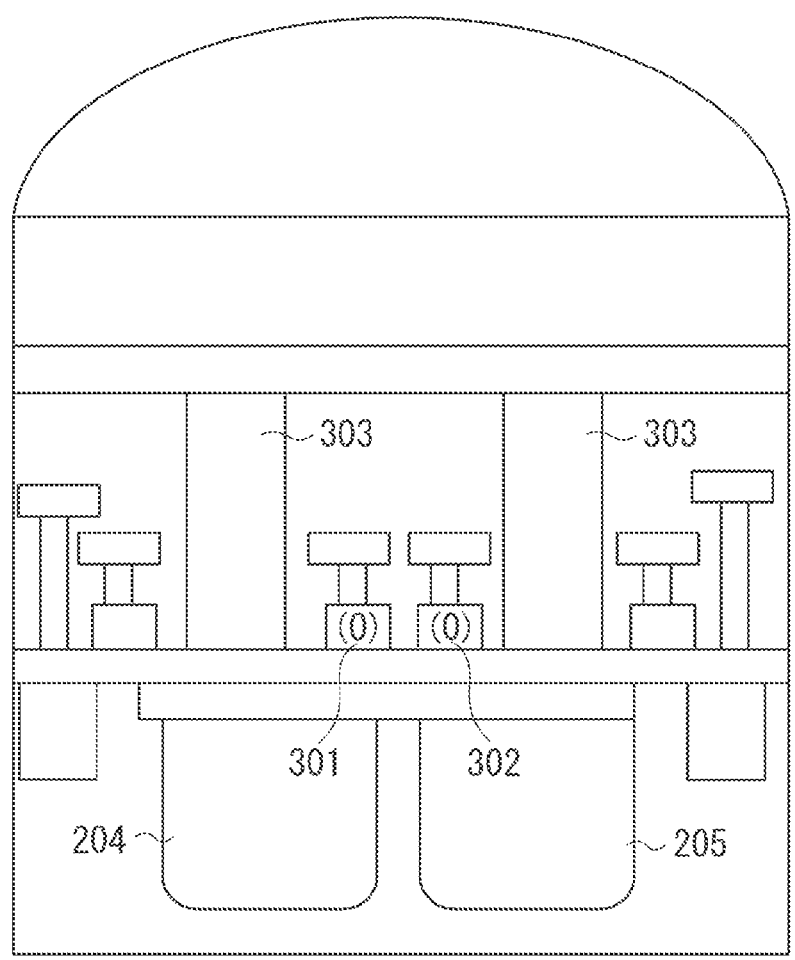
FIG. 10A is a diagrams illustrating a method for controlling the solid-state image sensor according to the second exemplary embodiment.
Figure 10B:
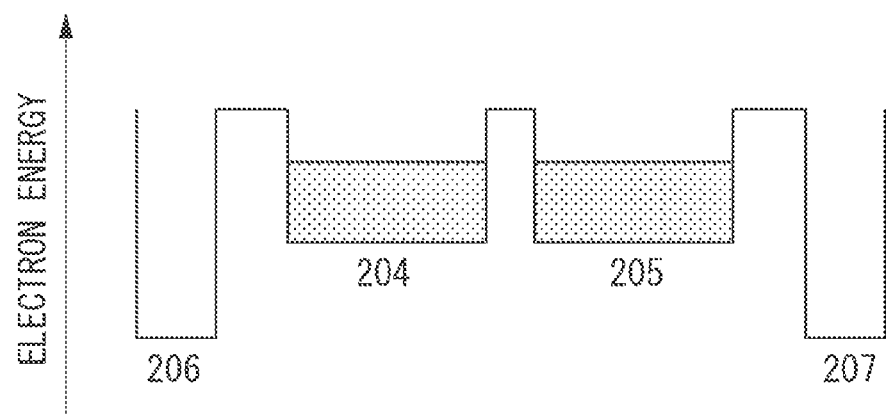
FIG. 10B is a diagram illustrating an electron energy of the image elements of FIG. 10A according to the second exemplary embodiment.

As a normal mode, as illustrated in FIGS. 10A and 10B, when no voltages are applied to the control electrodes 301 and 302 (FIG. 10A), the electron energy distribution of the semiconductor 201 is determined by a manufactured doping concentration. Since the photoelectric conversion elements 204 and 205 accumulate electrons, the semiconductor 201 is formed of an N-type such that the electron energy is lowered (FIG. 10B). In this case, since no voltages are applied, power consumption is low. Therefore, long-time distance measurement or image capture is enabled. Furthermore, when the first photoelectric conversion element 204 and the second photoelectric conversion element 205 are formed to be bilaterally symmetric from the center of the pixel, the SN ratio may increase in both the image A and the image B.

Figure 11A:
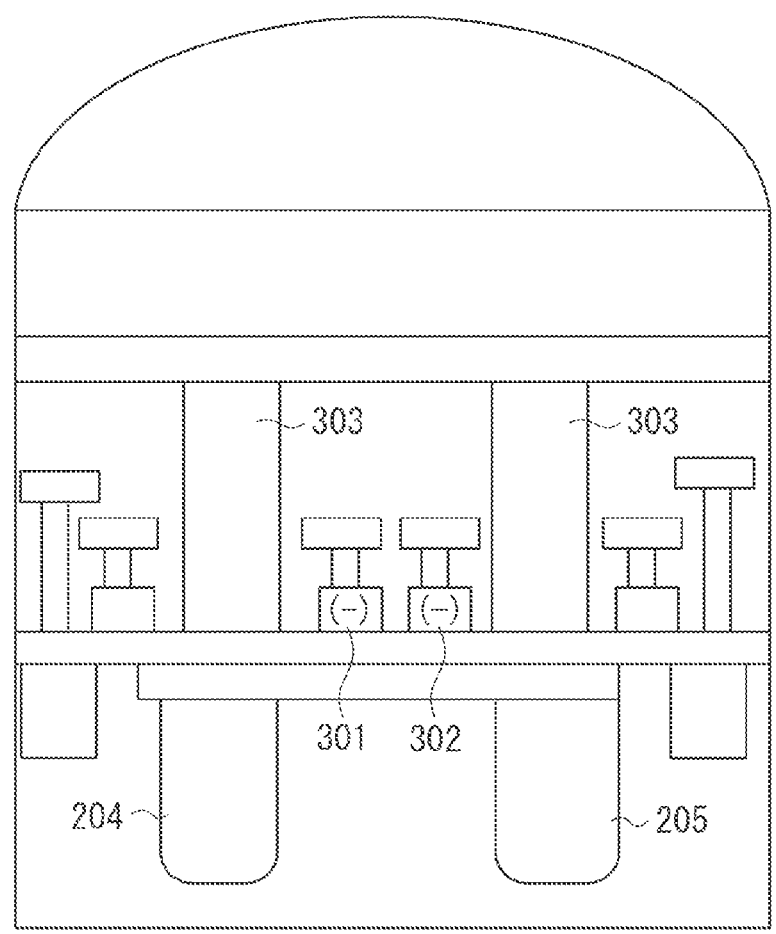
FIG. 11A is a diagram illustrating a method for controlling the solid-state image sensor according to the second exemplary embodiment.
Figure 11B:
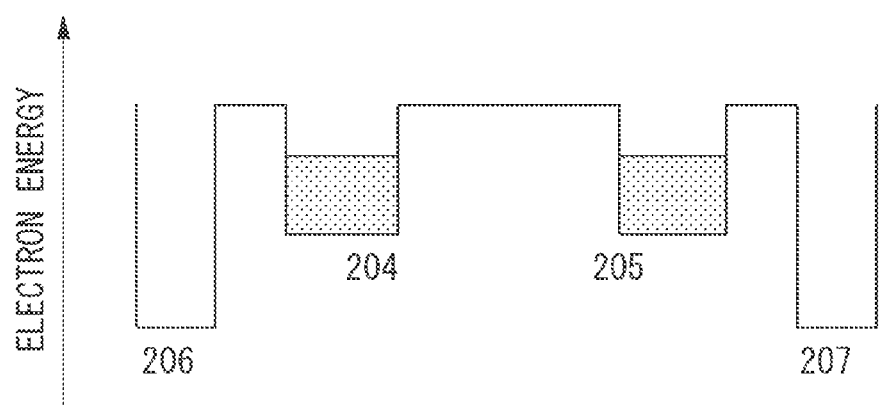
FIG. 11B is a diagram illustrating an electron energy of the image elements in FIG. 11A according to the second exemplary embodiment.

Also, as a high-accuracy mode, when the distance measurement is performed with high accuracy, a base length 107 needs to be lengthened. In this case, in the distance measurement pixel for acquiring the image A and the image B (FIG. 11A), a negative potential is applied to the control electrodes 301 and 302. In this manner, the electron energy distribution is obtained as illustrated in FIG. 11B. The centers of gravity of the first photoelectric conversion element 204 and the second photoelectric conversion element 205 move outward away from the central axis of the pixel. By using the image A and the image B, the first photoelectric conversion element 204 and the second photoelectric conversion element 205 displaced outward from the central axis of the pixel may be obtained. Therefore, the base length 107 may be lengthened, and the distance accuracy improves accordingly.

As described above, by arranging the control electrodes 301 and 302 near the photoelectric conversion elements 204 and 205 and applying the voltages thereto, the electron energy distributions of the photoelectric conversion elements 204 and 205 and the surrounding thereof changes. Therefore, the positions or shapes of the photoelectric conversion elements 204 and 205 may be dynamically controlled. In this manner, the distance measurement apparatus may achieve the optimal distance measurement and the acquisition of object images according to the object or the imaging condition. Also, due to the dynamic change, the entire distance measurement pixels may be used for the distance information or image capture information. Therefore, the distance accuracy improves, and the SN ratio of the captured image improves.

Figure 12:
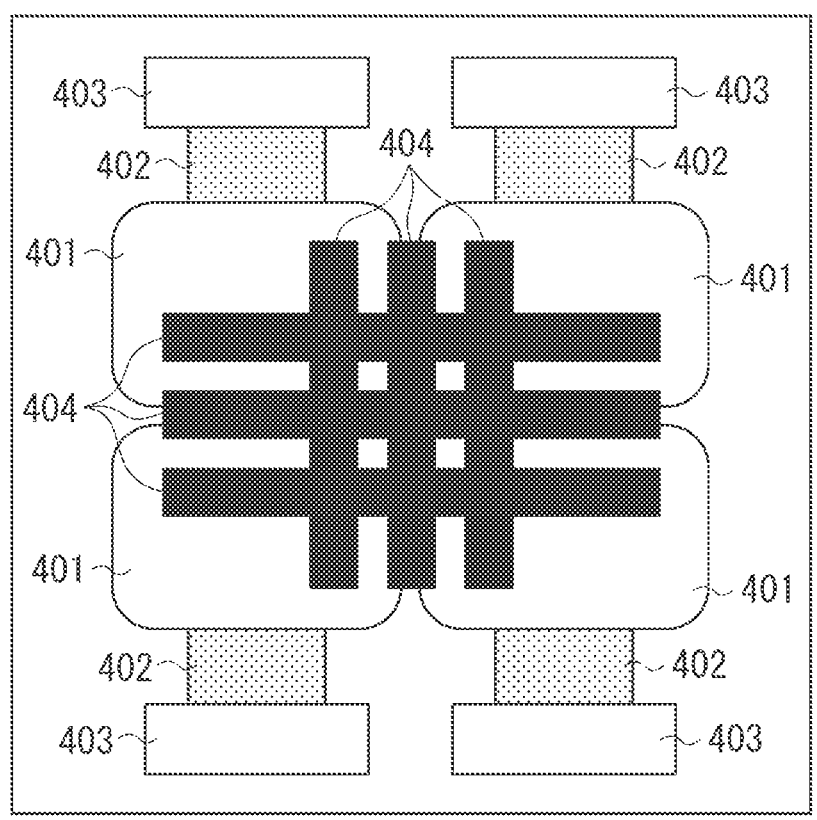
FIG. 12 is a schematic top view illustrating a distance measurement pixel in a solid-state image sensor according to an exemplary embodiment other than the first and second exemplary embodiments.

In the first and second embodiments, the case where two photoelectric conversion elements are included within the distance measurement pixel has been described. In this case, the photoelectric conversion element has only to be divided into two parts within the pixel. Therefore, the distance measurement pixel may be configured without excessively lowering the aperture ratio (the ratio of the entire photoelectric conversion element occupied in the pixel) and the capacity of the photoelectric conversion elements. However, the number of the photoelectric conversion elements within the distance measurement pixel is not limited to two. For example, as illustrated in FIG. 12, four photoelectric conversion elements may be included.

In this case, since the exit pupil may be divided vertically and horizontally, the distance may be measured with high accuracy to any object on a vertical line or a horizontal line. In FIG. 12 illustrating a top view of the distance measurement pixel, the pixel includes four photoelectric conversion elements 401, four gate electrodes 402, and four FD portions 403 to detect signals of incident light by the respective photoelectric conversion elements 401. In this case, by arranging a plurality of control electrodes 404, the distance measurement apparatus may achieve the optimal distance measurement and the acquisition of object images according to the object or the photographing condition as in the first and second embodiments.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2012-013007 filed Jan. 25, 2012, which is hereby incorporated by reference herein in its entirety.

What is claimed is:

1. A distance measurement apparatus comprising:
an imaging lens; and
a solid-state image sensor,
wherein the solid-state image sensor comprises:
a plurality of pixels,
wherein at least one pixel of the plurality of pixels includes:
a microlens,
an insulating film,
a plurality of photoelectric conversion elements disposed on one side of the insulating film, and
a control electrode disposed on the other side of the insulating film,
wherein the plurality of photoelectric conversion elements is configured to receive light flux passing through the microlens, and
wherein the control electrode is configured to change a distance between centers of gravity of the photoelectric conversion elements by applied voltages, and
wherein the distance measurement apparatus is configured to detect images by light flux passing through different exit pupil areas of the imaging lens by using the plurality of pixels to measure a distance based on a deviation amount of the images.

2. The distance measurement apparatus according to claim 1, wherein the control electrode is configured to change electron energy distributions of the plurality of photoelectric conversion elements and therearound by the applied voltages.

3. The distance measurement apparatus according to claim 1, wherein the control electrode includes a plurality of control electrodes disposed in the at least one pixel.

4. The distance measurement apparatus according to claim 1, wherein the control electrode is disposed on each of the plurality of photoelectric conversion elements.

5. The distance measurement apparatus according to claim 1, wherein the control electrode is disposed between the plurality of photoelectric conversion elements.

6. The distance measurement apparatus according to claim 1, wherein the plurality of photoelectric conversion elements has an asymmetric incident angle sensitivity characteristic.

7. The distance measurement apparatus according to claim 1, wherein the plurality of photoelectric conversion elements includes a back side illumination type in which light incident on each of the photoelectric conversion elements is incident from a direction opposite the control electrode.

8. The distance measurement apparatus according to claim 1, wherein the distance measurement apparatus is configured to be switchable between measurement modes having different incident angle sensitivity characteristics according to the applied voltages.

9. The distance measurement apparatus according to claim 1, wherein the control electrode is disposed near a central axis side of the at least one pixel, and
wherein a base length is lengthened by displacing a center of gravity of each of the plurality of photoelectric conversion elements outward from the central axis by the applied voltages.

10. The distance measurement apparatus according to claim 1, wherein the control electrode is disposed near a central axis side of the at least one pixel, and wherein an area ratio of the plurality of photoelectric conversion elements in the distance measurement pixel is changed by the applied voltages.

11. A camera comprising the distance measurement apparatus according to claim 1.

* * * * *